UNITED STATES PATENT OFFICE.

ADOLPH FRANK, OF CHARLOTTENBURG, GERMANY.

METHOD OF PRODUCING HYDROGEN FROM WATER-GAS.

No. 873,853.      Specification of Letters Patent.      Patented Dec. 17, 1907.

Application filed November 15, 1906. Serial No. 343,522.

*To all whom it may concern:*

Be it known that I, ADOLPH FRANK, a subject of the King of Prussia, residing at 26 Berlinerstrasse, Charlottenburg, Germany, have invented certain new and useful Improvements in Methods of Producing Hydrogen from Water-Gas; and I do hereby declare the following to be a full, clear, and exact description of the invention.

The present invention has for its object a method of producing practically pure hydrogen from water-gas.

The production of practically pure hydrogen from water-gas was not possible hitherto on an extensive scale. Water-gas obtained on a large scale represents a quantity of hydrogen and carbon monoxid, besides some carbonic acid and nitrogen, and small quantities of heavy and saturated hydrocarbons, and to obtain practically pure hydrogen from this mixture was connected with such great difficulties that it could not be generally introduced in the technical practice.

Now an important object of the present invention is to absorb the compounds which in addition to hydrogen are in water-gas in one or two operations following one after another, with the result that almost chemically pure hydrogen is obtained as the final product. For this purpose water-gas which is previously dried as much as possible is conducted over carbid, e. g. calcium carbid, at a temperature of over 300° C. The calcium carbid may be pure or be mixed with other carbids, or with other inert materials which promote the absorption, or with such as reduce the temperature of absorption. When water-gas is conducted over carbid thus heated, an absorption of all the intermixtures with the hydrogen takes place. Carbon monoxid or carbonic acid are formed with the carbid and lime or carbonate of lime and carbon. The nitrogen is likewise absorbed. The heavy or saturated hydrocarbons are decomposed when passing over the heated lime-carbon material with the separation of carbon. Almost chemically pure hydrogen is ultimately obtained as the final product. The reaction may also be so conducted that carbonic acid or carbon monoxid is previously entirely or partially removed from the water-gas by means of an absorption medium, such as lime or cuprous chlorid solution (acid, neutral or alkaline) in order to relieve the carbid, and in this manner a mixture which is rich in hydrogen is in the first place produced which, as stated above, is submitted to the action of carbid. When working in this manner the regeneration of the cuprous chlorid solution is effected by the same being subjected, after saturation with carbon monoxid, to the action of a vacuum. In this manner the carbon monoxid dissolved in the cuprous chlorid solution is removed from the same at an ordinary temperature and may be obtained apart in itself in a pure condition, whereas the cuprous chlorid solution is used again in the process. In all these cases the hydrogen which is obtained is then subjected to a final purification by conducting it over carbid in the manner above described.

What I claim as my invention and desire to secure by Letters Patent is:—

1. A method of producing practically pure hydrogen from water-gas, consisting in conducting water-gas over heated carbid.

2. A method of producing practically pure hydrogen from water-gas, consisting in removing carbonic acid and carbon monoxid from said water-gas by means of absorption and in conducting the residual gases over heated carbid.

3. A method of producing practically pure hydrogen from water-gas, consisting in removing carbonic acid and carbon monoxid from said water-gas by means of absorption of the same in cuprous chlorid solution, in conducting the residual gases over heated carbid and in removing said carbonic acid and carbon monoxid from said cuprous chlorid solution, for re-use in absorbing carbonic acid and carbon monoxid.

In testimony whereof I have signed my name to this specification, in the presence of two subscribing witnesses.

ADOLPH FRANK.

Witnesses:
    HENRY HASPER,
    WOLDEMAR HAUPT.